US006883066B2

United States Patent
Herbst et al.

(10) Patent No.: US 6,883,066 B2
(45) Date of Patent: Apr. 19, 2005

(54) METHOD AND SYSTEM FOR CACHE MANAGEMENT ALGORITHM SELECTION

(75) Inventors: James Arthur Herbst, Longmont, CO (US); Carol Michiko Baum, Longmont, CO (US); Robert William Dixon, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 413 days.

(21) Appl. No.: 10/014,371

(22) Filed: Dec. 11, 2001

(65) Prior Publication Data

US 2003/0061444 A1 Mar. 27, 2003

Related U.S. Application Data

(60) Provisional application No. 60/322,493, filed on Sep. 14, 2001.

(51) Int. Cl.[7] .............................................. G06F 12/00
(52) U.S. Cl. ...................... 711/118; 711/117; 711/129; 711/133; 711/134
(58) Field of Search .................... 711/117–118, 129, 711/133, 134, 113, 127; 717/158

(56) References Cited

U.S. PATENT DOCUMENTS

| | | | | |
|---|---|---|---|---|
| 5,035,302 A | | 7/1991 | Thangavelu ................ 187/125 |
| 5,257,360 A | * | 10/1993 | Schnizlein et al. ......... 711/118 |
| 5,283,875 A | | 2/1994 | Gibson et al. .............. 395/400 |
| 5,353,430 A | | 10/1994 | Lautzenheiser ............. 395/425 |
| 5,734,908 A | | 3/1998 | Chan et al. ................ 395/709 |
| 5,805,863 A | * | 9/1998 | Chang ........................ 717/158 |
| 5,920,887 A | | 7/1999 | Sokolov et al. ............ 711/113 |
| 6,018,789 A | | 1/2000 | Sokolov et al. ............ 711/113 |
| 6,032,227 A | * | 2/2000 | Shaheen et al. ............ 711/129 |
| 6,058,456 A | * | 5/2000 | Arimilli et al. ............ 711/129 |
| 6,129,458 A | * | 10/2000 | Waters et al. .............. 711/133 |
| 2001/0049770 A1 | * | 12/2001 | Cai et al. ................... 711/129 |
| 2002/0116585 A1 | * | 8/2002 | Scherr ........................ 711/133 |
| 2002/0147888 A1 | * | 10/2002 | Trevathan .................. 711/133 |

OTHER PUBLICATIONS

A. Veidenbaum et al, Adapting Cache Line Size to Application Behavior. Proceedings of the 13 th ACM International Conference on Supercomputing, 1999(ICS '99). http://citeseer.ist.psu.edu/veidenbaum99adapting.htm.*

* cited by examiner

*Primary Examiner*—Matthew Anderson
*Assistant Examiner*—Zhuo H. Li
(74) *Attorney, Agent, or Firm*—Fish & Richardson P.C., P.A.

(57) ABSTRACT

In a data storage device, a system of method of optimizing cache management. A method includes selecting a set of cache management algorithms associated with a predetermined pattern in a sequence of commands. Statistics based on a sequence of commands are gathered and a pattern is detected from the statistics. The pattern is associated with predetermined known patterns to identify a set of cache management algorithms that are optimized for the known pattern. A system includes usage statistics that are correlated among a set of known usage patterns. A switch chooses the set of cache management algorithms associated with the known pattern that most closely matches the usage statistics.

12 Claims, 6 Drawing Sheets

METHOD AND SYSTEM FOR CACHE MANAGEMENT ALGORITHM SELECTION

RELATED APPLICATIONS

This application claims priority of U.S. provisional application Ser. No. 60/322,493, filed Sep. 14, 2001.

FIELD OF THE INVENTION

This application relates generally to mass data storage devices and more particularly to cache management algorithm selection in a mass data storage device.

BACKGROUND OF THE INVENTION

Mass data storage devices, such as disc drives or magnetic tape drives, include a storage media enabling users of modern computer systems to store and retrieve vast amounts of data in a fast and efficient manner. Generally, to access data on the storage media a relatively slow (in computer terms) mechanical process is employed. For example, a typical disc drive houses a number of circular, magnetic discs (such as one to ten) which are axially aligned and rotated by a spindle motor at a constant, high speed (such as 10,000 revolutions per minute). As the discs are rotated, an actuator assembly moves an array of read/write heads out over the surfaces of the discs to store and retrieve the data from tracks defined on the surfaces of the discs.

A disc drive is typically connected to a host computer having an operating system, a filing system, and one or more applications running. Via the OS, the file system, and/or the applications, the host computer issues commands to the disc drive. Exemplary commands are read, write, and flush cache commands. A disc drive employs a cache, which is typically a high-speed semiconductor memory chip that enables the disc drive to rapidly manage the data and commands received from the host computer. Without caching, all read and write commands from the host computer would result in a hard disc access, which incurs significant time latency due to mechanical positioning of the head relative to the hard disc. By caching, the disc drive can buffer data that is likely to be accessed by the host computer so that when the data is actually accessed, the data is made available more quickly. Typically a disc drive utilizes a default set of algorithms to manage the cache and interface with the host computer, regardless of the host computer platform.

Traditionally, the algorithms used by the disc drive are selected to optimize one or more benchmarks. Disc drive manufacturers test disc drives relative to certain performance benchmarks. These benchmarks are published in trade magazines and are used for marketing. To test the performance benchmarks of disc drives, applications such as WinBench, Iometer, MacBench, H2Bench, and BlueNun, are used to test disc drives on relevant host platforms. For example, the application WinBench is used to test the performance of a disc drive in a PC environment using a Microsoft Windows® operating system. Likewise, the application MacBench can be used to test the performance of a disc drive on an Apple MacIntosh® computer. It has been found that in general all performance benchmarks for a disc drive cannot be optimized on all computer platforms because command sequencing is different among the various platforms. Because command sequencing varies among computer platforms, for one set of cache management algorithms, the cache hit ratio will vary among the computer platforms. When the cache hit ratio is lower, performance is lower. Thus, for example, while performance benchmarks may be optimized in a Microsoft Windows® environment, those performance benchmarks may not be optimized in an Apple® operating system environment.

One reason for the inability to optimize for all platforms is because typical disc drives utilize only one set of cache management algorithms. Traditional disc drives do not adapt the cache management algorithms to the platform on which the disc drive is running. Therefore, while the cache management algorithm may be optimal for a Microsoft Windows® environment, it may be sub-optimal for an Apple environment utilizing a different sequence of commands. For example, in the Microsoft Windows® NTFS operating system, the host regularly writes to the middle cylinders of the disc and regularly flushes the cache to disc. In the Microsoft Windows® NTFS operating system, it is more efficient to wait for the flush cache command before committing these writes to disc. In the Microsoft Windows 98® FATS operating system, the host computer rarely sends the flush cache command. To optimize disc drive performance in the Microsoft Windows 98® FATS operating system, the disc drive should flush writes as quickly as possible so that the write buffer space can be reused for future write commands from the host. As a result, benchmark test results have not been subject to improvement across all host computer platforms. Therefore, there is a need for a system and method to adapt cache management algorithms to the host platform connected to the disc drive, so that benchmark results are improved across all host computer platforms.

Furthermore, a constant push exists in the industry toward improving benchmark scores. Benchmark scores are publicized so that computer purchasers can make judgments as to which computer and/or disc drive to purchase. Thus, it is essential for disc drive manufacturers to improve benchmark scores. As a result, performance benchmarks for disc drives under WinBench, for example, have been improving by around ten percent per year in recent years. Since the cache memory is a limited and relatively costly resource in the disc drive, it is desirable to utilize the cache memory as efficiently as possible, and benchmark scores are directly related to cache memory utilization.

Additionally, from a computer user's standpoint, perceived performance is improved when the cache management algorithms are matched with the host computer command sequence. However, since typical disc drives use only a default set of cache management algorithms that are not necessarily optimized for a user's host computer, the perceived performance is lower from the user's point of view. Therefore, there is a need for a dynamic cache management algorithm selection method and system to improve drive performance during benchmark testing and during actual computer use.

SUMMARY OF THE INVENTION

Against this backdrop embodiments of the present invention have been developed. Embodiments of the present invention include a system and method of adaptively selecting algorithms utilized by a disc drive, depending on the host that issues the commands to the disc drive. An embodiment of the present invention is a unique method of adaptively selecting an algorithm used in a disc drive to read or write data, depending on statistics of commands issued by the host computer. By adapting the algorithm to the particular host, the data rate can be increased from the host's perspective.

One embodiment includes a cache manager having a configuration module, a set of cache management algorithms, and a recognition module. The recognition module includes usage statistics, a correlator, a switch module, and a cache management executive. The correlator detects a best match between the usage statistics and pattern data in the configuration module. The switch module directs the cache management executive to execute the algorithms associated with the best matched pattern data.

These and various other features as well as advantages which characterize the present invention will be apparent from a reading of the following detailed description and a review of the associated drawings.

DETAILED DESCRIPTION

The invention is described in detail below with reference to the figures. When referring to the figures, like structures and elements shown throughout are indicated with like reference numerals.

Figure 1:
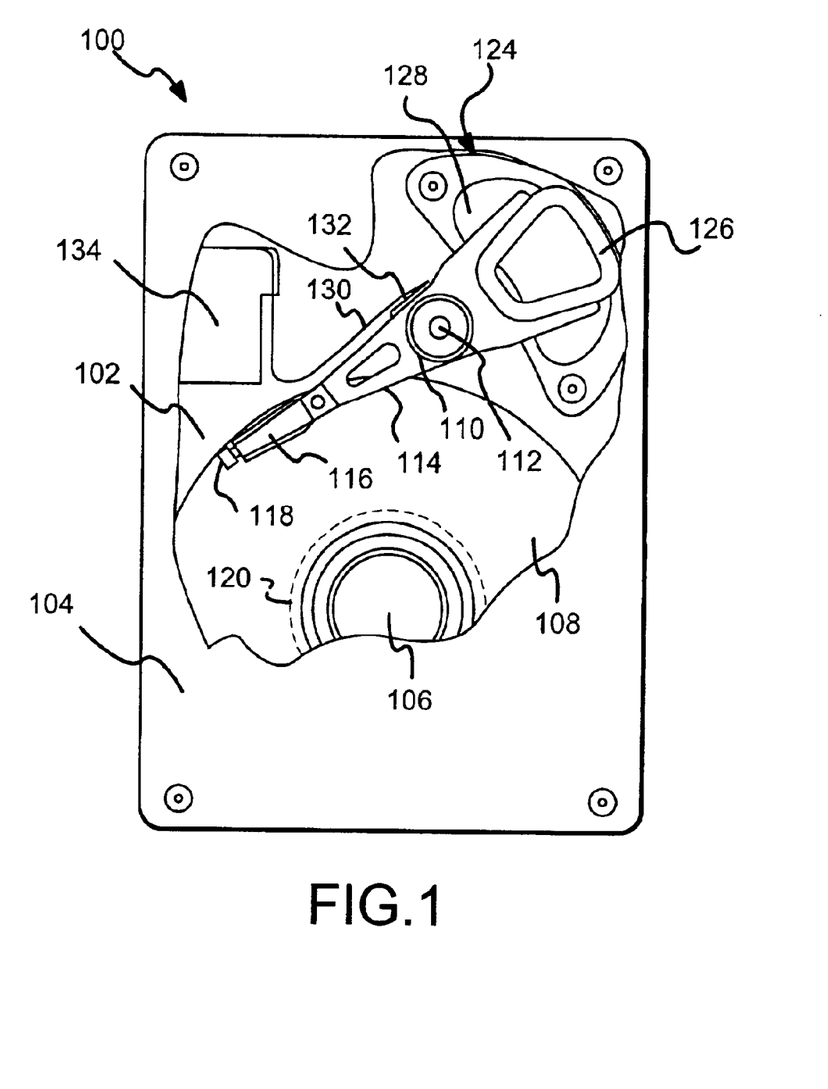
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
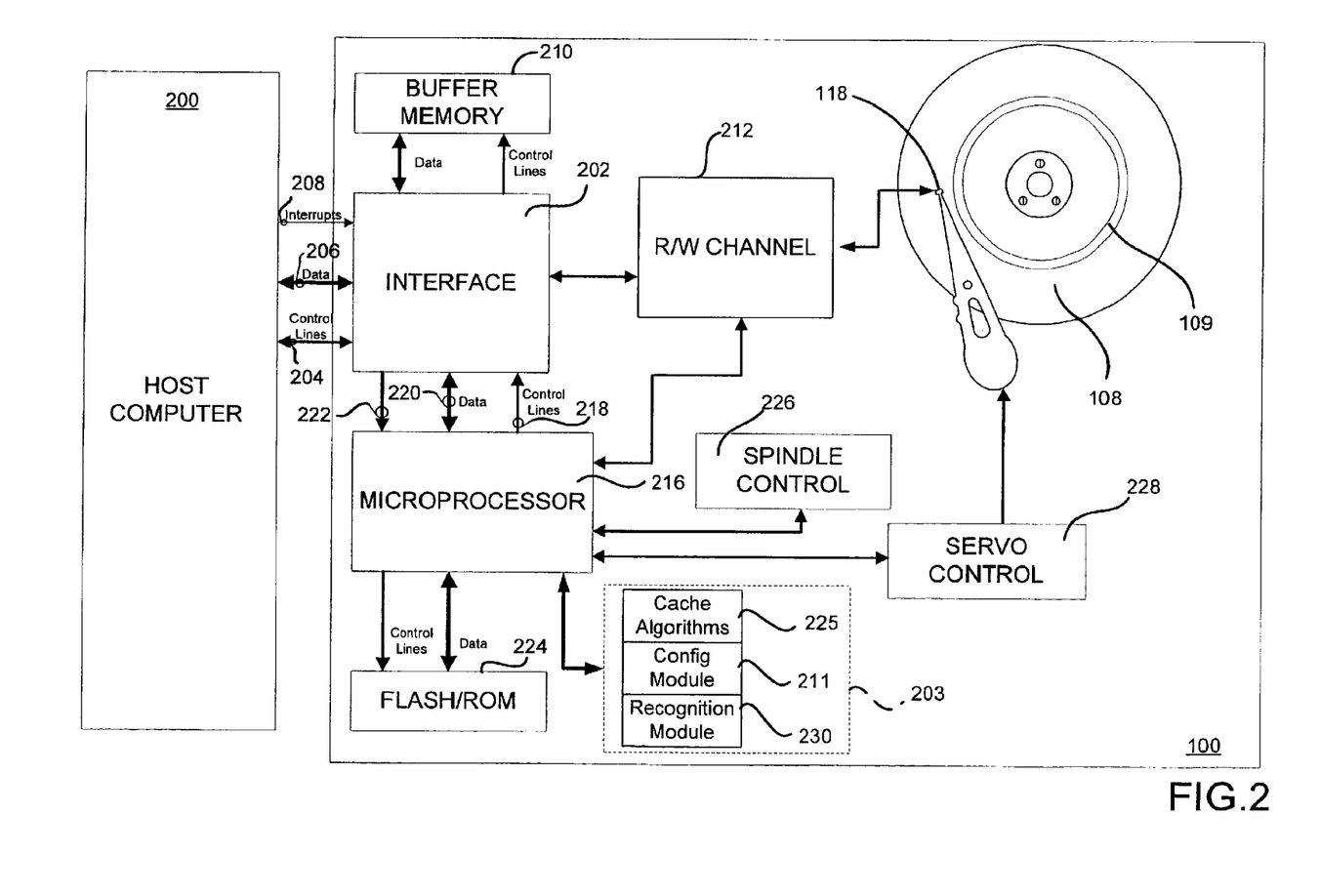
FIG. 2 is a functional block diagram of the disc drive of FIG. 1 in accordance with a preferred embodiment of the present invention.

Referring now to FIG. 2, shown therein is a functional block diagram of the disc drive 100 of FIG. 1, generally showing the main functional circuits which are typically resident on a disc drive printed circuit board and which are used to control the operation of the disc drive 100. As shown in FIG. 2, the host 200 is operably connected to an interface application specific integrated circuit (interface) 202 via control lines 204, data lines 206, and interrupt lines 208. The interface 202 typically includes an associated buffer 210 which facilitates high speed data transfer between the host 200 and the disc drive 100. The buffer 210 may be referred to as cache memory. Data to be written to the disc drive 100 are passed from the host to the interface 202 and then to a read/write channel 212, which encodes and serializes the data. A cache manager 203 is included to manage the cache memory of the buffer 210 in response to commands received from the host 200. The cache manager 203 is operable to dynamically select a cache management algorithm corresponding to a pattern of access exhibited by the host 200. Details of the cache manager 203 are discussed below.

The read/write channel 212 also provides the requisite write current signals to the heads 118. To retrieve data that has been previously stored by the disc drive 100, read signals are generated by the heads 118 and provided to the read/write channel 212, which processes and outputs the retrieved data to the interface 202 for subsequent transfer to the host 200. Such operations of the disc drive 100 are well known in the art and are discussed, for example, in U.S. Pat. No. 5,276,662 issued Jan. 4, 1994 to Shaver et al.

As also shown in FIG. 2, a microprocessor 216 is operably connected to the interface 202 via control lines 218, data lines 220, and interrupt lines 222. The microprocessor 216 provides top level communication and control for the disc drive 100 in conjunction with programming for the microprocessor 216 which is typically stored in a microprocessor memory (MEM) 224. The MEM 224 can include random access memory (RAM), read only memory (ROM) and other sources of resident memory for the microprocessor 216. Additionally, the microprocessor 216 provides control signals for spindle control 226, and servo control 228.

When the disc drive 100 is powered up, the cache manager module 203 is preferably copied from one or more reserve tracks 109 on the data disc 108 to the MEM 224. The cache manager module 203 consists of cache management algorithms 225, a configuration module 211, and a configuration recognition module 230. The cache management algorithms 225 include computer executable methods, steps, and/or operations that, when executed by the microprocessor 216, perform cache management functions. As is discussed below, the cache management algorithms 225 include one or more sets of algorithms, with each set being associated with a command sequence pattern. The configuration module 211 contains sets of command sequence pattern data for known host computer platforms and other patterns. As is discussed below, pattern data in the configuration module 211 may be used to identify command sequence patterns and adapt the cache management algorithms 225 accordingly to improve the efficiency of cache 210 usage. The configuration recognition module 230 includes computer executable methods, steps, and/or operations that, when executed by the microprocessor 216, perform recognition of data patterns stored in the configuration module 211.

As is discussed herein, the cache management algorithms 225 may be updated during operation to adapt cache management to correspond to a recognized disc drive access pattern exhibited by the host computer 200. Updating the cache management software may involve copying new cache management software from the disc 108 to the MEM 224.

Figure 3:
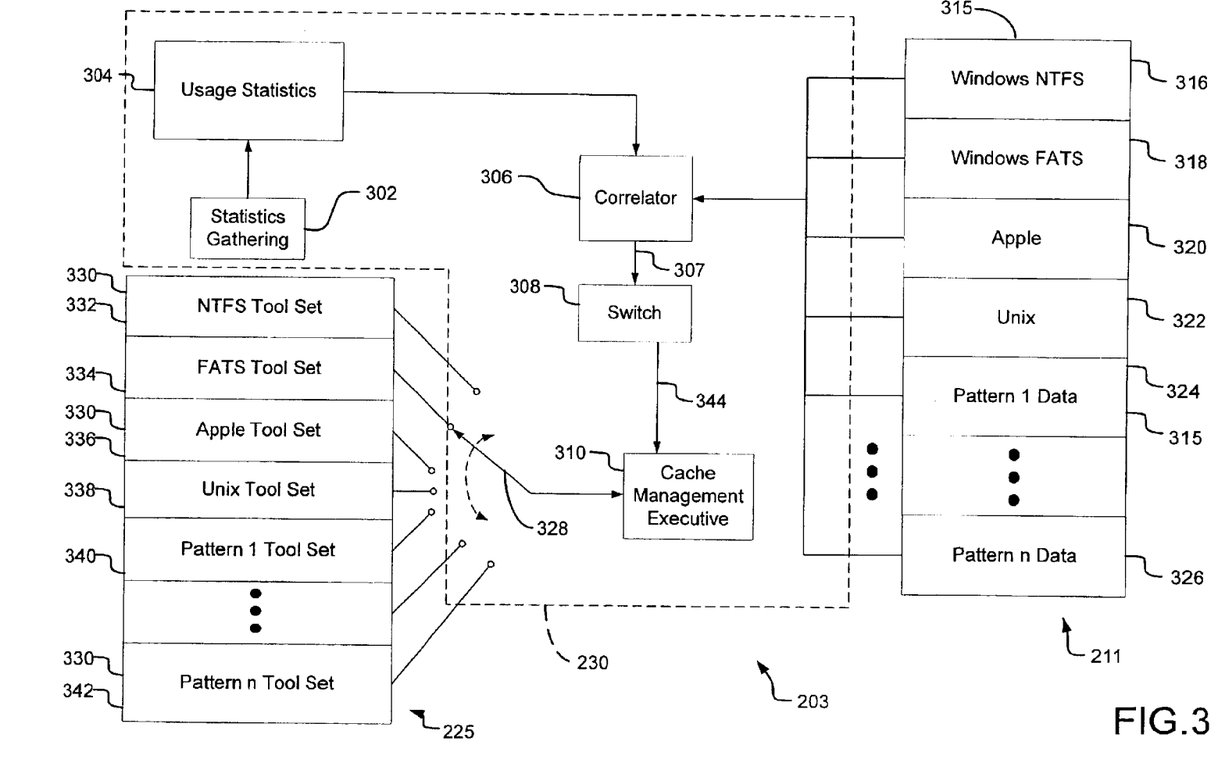
FIG. 3 is a functional block diagram of the cache manager of FIG. 2 utilizing sets of cache management algorithms and configuration data in accordance with an exemplary embodiment of the present invention.

FIG. 3 is a functional block diagram of the cache manager 203 of FIG. 2 utilizing sets of cache management algorithms and configuration data in accordance with an exemplary embodiment of the present invention. Generally, the configuration recognition module 230 gathers statistics related to command sequences from the host computer (such as 200 in FIG. 2), identifies a pattern in the command sequences, associates the pattern with a known pattern, and switches to a set of cache management algorithms associated with the known pattern. The configuration recognition module 230 of FIG. 3 includes a statistics-gathering module 302, usage statistics 304, a correlator 306, a switch module 308, and a cache management executive 312.

The statistics-gathering module 302 preferably identifies and gathers statistics related to a sequence of commands coming from the host computer (such as 200 in FIG. 2). Statistics that are gathered by the statistics-gathering module 302 may consist of any relevant statistics that may assist in associating the command sequence with a known pattern of commands. For example, the statistics-gathering module 302 may accumulate a number of read commands in a group of commands to generate a read percentage value, which may be used to indicate a pattern in the command sequence. By way of further example, and not limitation, the statistics-gathering module 302 may gather the most recently accessed locations in logical block (LBA) address memory. The statistics-gathering module 302 may be implemented by use of a First-In-First-Out (FIFO) array.

The most recently accessed logical locations in memory may be used to identify a disc usage pattern and thereby optimize the cache management algorithms. Additionally, the usage statistics may include sequential statistical patterns, random patterns, and logical memory distances between adjacent commands. The logical memory distances may be used to determine whether the disc drive pre-fetch or post-fetch size should be increased or decreased. The statistics-gathering module 302 stores the gathered statistics in the usage statistics 304. The usage statistics 304 preferably consist of binary encode data stored in RAM in the disc drive 100. Usage statistics 304 may be stored in any logical memory structure applicable to the particular implementation. The usage statistics 304 are accessed by the correlator 306. The correlator 306 reads data from the usage statistics 304 and correlates the data with pattern data 315 in the configuration module 211. The pattern data 315 includes statistical data analogous to the statistics gathered by the statistics gathering module 302, and associated with known host computer platforms or known disc usage and/or access patterns. The pattern data 315 may be in any format, such as a data structure holding the relevant data.

For example, configuration module 211 includes Microsoft Windows® NTFS pattern data 316, Microsoft Windows® FATS pattern data 318, Apple® pattern data 320, and UNIX pattern data 322. Additionally, the configuration module 211 includes pattern one data 324 through pattern 'n' data 326. The configuration module 211 is preferably stored in the MEM 224 so that it can be rapidly accessed by the correlator 306. The pattern data 315 of the configuration module 211 may include any data indicative of known host computer platforms or recognized patterns, such as, but not limited to, sequential patterns, random patterns, logical memory location patterns, and memory distances accessed between adjacent commands. To illustrate, a structure may be stored in the Microsoft Windows® NTFS pattern data 316 as shown in the exemplary pseudocode in Table 1:

TABLE 1

```
#define Write_DMA_retry 0x5
#define Flush_cache 0xA
#define Windows_NTFS_threshold 4
struct pattern_data      {char first_command;
                          char second_command;
                          char threshold;
                          };
static struct pattern_data Windows_NTFS = {
                                          Write_DMA_retry,
                                          Flush_cache,
                                          Windows_NTFS_threshold
                                          };
```

The structure "Windows_NTFS" above contains a pair of commands (Write_DMA_retry and Flush_cache) associated with the Microsoft Windows® NTFS system along with a threshold value (Windows_NTFS_threshold). The structure can be used to recognize a pattern of commands associated with a host 200 running Microsoft Windows® NTFS. The exemplary structure in Table 1 may be used to recognize when four pairs of Write Direct Memory Access (DMA) with retry/Flush cache commands are received from the host 200. The Windows_NTFS structure may be stored in the Microsoft Windows® NTFS pattern data 316 for use during runtime.

As another example, the pattern 1 data 324 may be a read count threshold value representing a count of consecutive read commands received. Thus, the pattern 1 data would be used to recognize a read mode. An example of a read mode is playing a video from stored on the disc. Similarly, pattern 2 data 326 (i.e., when 'n' equals two) may be a write count threshold value representing a count of the consecutive write commands received. The pattern 2 data would be used to recognize a write mode. An example of a write mode is during a download of video. Using this example, the usage statistics 304 may contain a count of consecutive read commands and a count of consecutive write commands. If the number of consecutive read commands received is greater than the read count threshold value, the usage statistics 304 would match the pattern 1 data 324. Similarly, if the number of consecutive write commands received is greater than the write count threshold value, the usage statistics 304 would match the pattern 2 data 326. Matching the usage statistics 304 to the pattern data 315 is performed by the correlator 306.

The correlator 306 reads the data from the configuration module 211 and correlates the pattern data with statistics read from the usage statistics 304. The correlator 306 may operate during idle times of the disc drive, stepping through each set of pattern data 315 in the configuration module 211. The correlator 306 may use any correlation or matching scheme known in the art to identify which of pattern data 315 in the configuration module 211 is most like the usage statistics 304. The correlator 306 outputs correlation data 307. The correlation data 307 may include a known pattern identifier (e.g. Microsoft Windows® NTFS) and an associated score. The known pattern identifier identifies one of the sets of pattern data 315 in configuration module 211 and the score represents a level of correlation or matching between the usage statistics 304 and the pattern data identifier.

The correlation data 307 are output to a switch module 308. The switch module 308 preferably selects one of the sets of pattern data 315 based on the correlation data 307 from the correlator 308. The switch module 308 determines which of the pattern data 315 best matches the usage statistics. A best match between the usage statistics and the pattern data 315 may be determined by ranking the sets of pattern data 315 by their respective scores and selecting the pattern data 315 with the best score. Any method of scoring the pattern data 315 may be used as is known in the art. For example, the best score may be the highest value, indicating a high degree of matching between the usage statistics and the pattern data 315. To further illustrate, the score may be a Boolean (i.e., true or false state) value indicating whether a match exists with the associated pattern identifier.

After the switch module 308 selects the pattern data 315 that is most similar to the usage statistics 304, the switch module 308 chooses a tool set 330 from the cache management algorithms 225 associated with the selected pattern data. Each of the tool sets 330 include algorithms for managing data caching. Exemplary tool sets are an NTFS tool set 332, a FATS tool set 334, an Apple tool set 336, a Unix tool set 338, a pattern one tool set 340, and so on, up to a pattern N tool set 342. Each of the tool sets 330 is associated with one set of pattern data 315 in the configuration module 211. Each tool set 330 is executable software designed to optimize cache management performance for the associated pattern data or host computer platform. The tool sets 330 may be stored in flash memory 224 or on the disc 108.

The switch module 308 transmits an algorithm selection message 344 to the cache management executive 312. The algorithm selection message 344 contains a data reference that allows the cache management executive 312 to access the selected tool set 330. The algorithm selection message 344 may include, for example, a memory offset to the selected tool set 330, so that the cache management executive 312 can execute the selected tool set 330. The cache management executive 312 preferably begins executing the algorithms in the selected tool set 330 at an appropriate time during processing so that there is a smooth transition from executing from one tool set 330 to execution from a newly selected tool set 330. For example, if the cache management executive 312 is executing algorithms in the NTFS tool set 332 when it receives an algorithm selection message 344 notifying of a switch to the FATS tool set 334, the executive 312 may store the memory offset to the FATS tool set 334, complete execution of several more procedures in the NTFS tool set 332, and then initiate execution of algorithms in the FATS tool set 334.

A switch 328 is shown choosing among the tool sets 330. The switch 328 is for illustrative purposes only and need not be a mechanical switch. The switch 328 is an abstraction indicating generally a selecting or choosing operation, whereby the switch module 308 directs the cache management executive 310 to execute algorithms from the selected tool set 330. The switch 328 can be implemented in software or hardware or a combination of hardware and software. For example, the algorithm selection message 344 from the switch module 308 may include a memory offset to the base of the selected tool set 330. The cache management executive 310 may use the memory address to begin executing algorithms out of the selected tool set 330.

To continue with the example above wherein pattern 1 data 324 contains a read count threshold value and pattern 2 data 326 contains a write count threshold value, when the correlator 306 identifies a match between the usage statistics 304 and pattern 1 data 324 (i.e., a read mode), the algorithm selection message 344 from the switch module 308 would indicate a switch to the pattern 1 tool set 340. In this scenario, the pattern 1 tool set 340 would contain an algorithm that allocates buffer memory 210 substantially or entirely to read data, rather than write data. By allocating most or all of the buffer memory 210 to read data during a read mode, the cache hit ratio will increase substantially, thereby improving the perceived data rate. Similarly, when the correlator 306 identifies a match between the usage statistics 304 and pattern 2 data 324 (i.e., a write mode), the algorithm selection message 344 from the switch module 308 would indicate a switch to the pattern 2 tool set 340. The pattern 2 tool set 340 would contain an algorithm that allocates buffer memory 210 substantially or entirely to write data, rather than read data.

Figure 4:
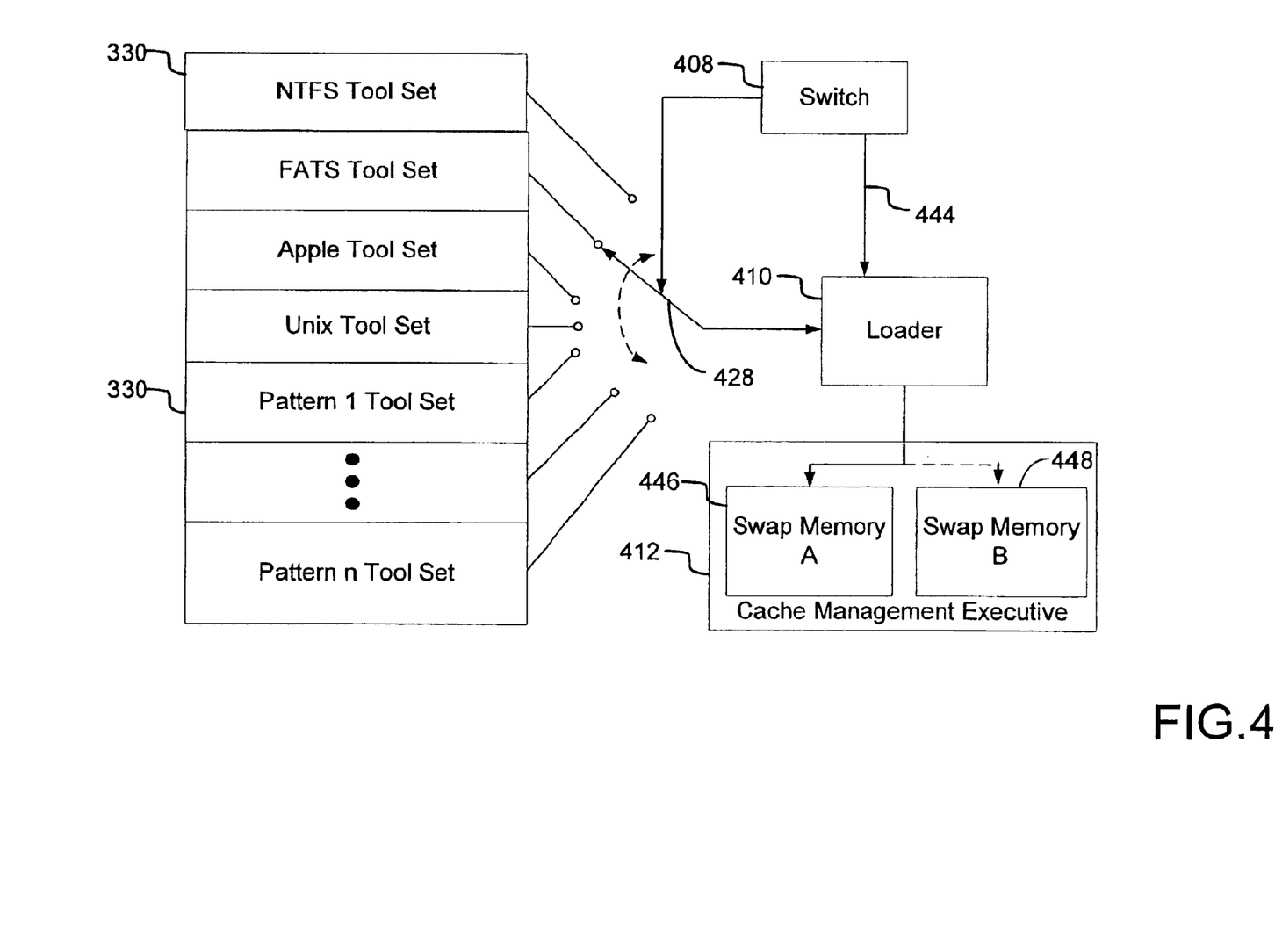
FIG. 4 is a module diagram a switch module selecting among cache management algorithms and inoperable communication with a cache management tools module in an exemplary embodiment of a cache manager of FIG. 2.

An alternative embodiment of the switch module and cache management executive are illustrated in FIG. 4. In the alternative embodiment, after the switch module 408 selects one of the tool sets 330, the switch module 408 sends a load signal 444 to a loader 410. A switch 428 is shown choosing among the tool sets 330. The switch 428 is for illustrative purposes only and need not be a mechanical switch. The switch 428 is an abstraction indicating generally a selecting or choosing operation, whereby the switch module 408 directs the loader 410 to load algorithms from the selected tool set 330. The switch 428 can be implemented in software or hardware or a combination of hardware and software. For example, the load signal 444 from the switch module 408 may include a memory offset to the base of the selected tool set 330. Using the memory offset, the loader 410 can switch 428 to the selected tool set 330. In response to receipt of the load signal 444, the loader 410 copies the selected tool set 330 into memory of the cache management executive 412. Preferably the loader 410 loads the selected tool set 330 during disc drive idle time. The cache management executive 412 executes cache management software algorithms residing in memory of the cache manager 203.

In the alternative embodiment of the cache management executive 412, a swapping system may be used, whereby a swap memory A 446 may be filled by the loader 410, while the cache management executive 412 is executing the cache management algorithms in another swap memory B 448. When the loader 410 is finished loading the swap memory A 446 with the selected tool set 330, the loader 410 may send a signal to the cache management executive 412 notifying the cache management executive 412 to switch to swap memory A 446. The cache management executive 412 may cease execution from swap memory B 448 and begin execution out of swap memory A 446. Thus, cache management algorithms resident in swap memory B 448 may be used to actively manage the cache 210 while swap memory A 446 is being loaded with another tool set. To further illustrate, cache management tools in swap memory A 446 may be executed while swap memory B 448 is being updated with new algorithms. In this embodiment, swap memory A 446 and swap memory B 448 are preferably located at known memory locations in memory such that swapping between them may be merely a matter of loading a base pointer to begin execution at the desired swap memory.

FIGS. 1–4 provide a system level overview of the operation of exemplary embodiments of the invention. In the figures that follow, the particular methods performed by a disc drive 100 executing an exemplary embodiment is described by reference to a series of flowcharts. The methods to be performed by a disc drive 100 constitute software programs made up of microprocessor-executable instructions. The software programs may be executed by the cache manager 203 in combination with other modules in the disc drive 100 shown in FIG. 2. Describing the methods by reference to a flowchart enables one skilled in the art to develop such programs including such instructions to carry out the methods on suitable computing devices (the microprocessor executing the instructions from computer-readable media). The methods are illustrated in FIG. 3 and are inclusive of the steps or acts required to be taken by the disc drive 100 operating in the environment shown in FIG. 2. The various software routines or software modules described herein may be implemented by any means known in the art. For example, any number of computer programming languages, such as "C", "C++", Pascal, FORTRAN, assembly language, Java, etc., may be used. Furthermore, various programming approaches such as procedural, object oriented or artificial intelligence techniques may be employed.

Figure 5:
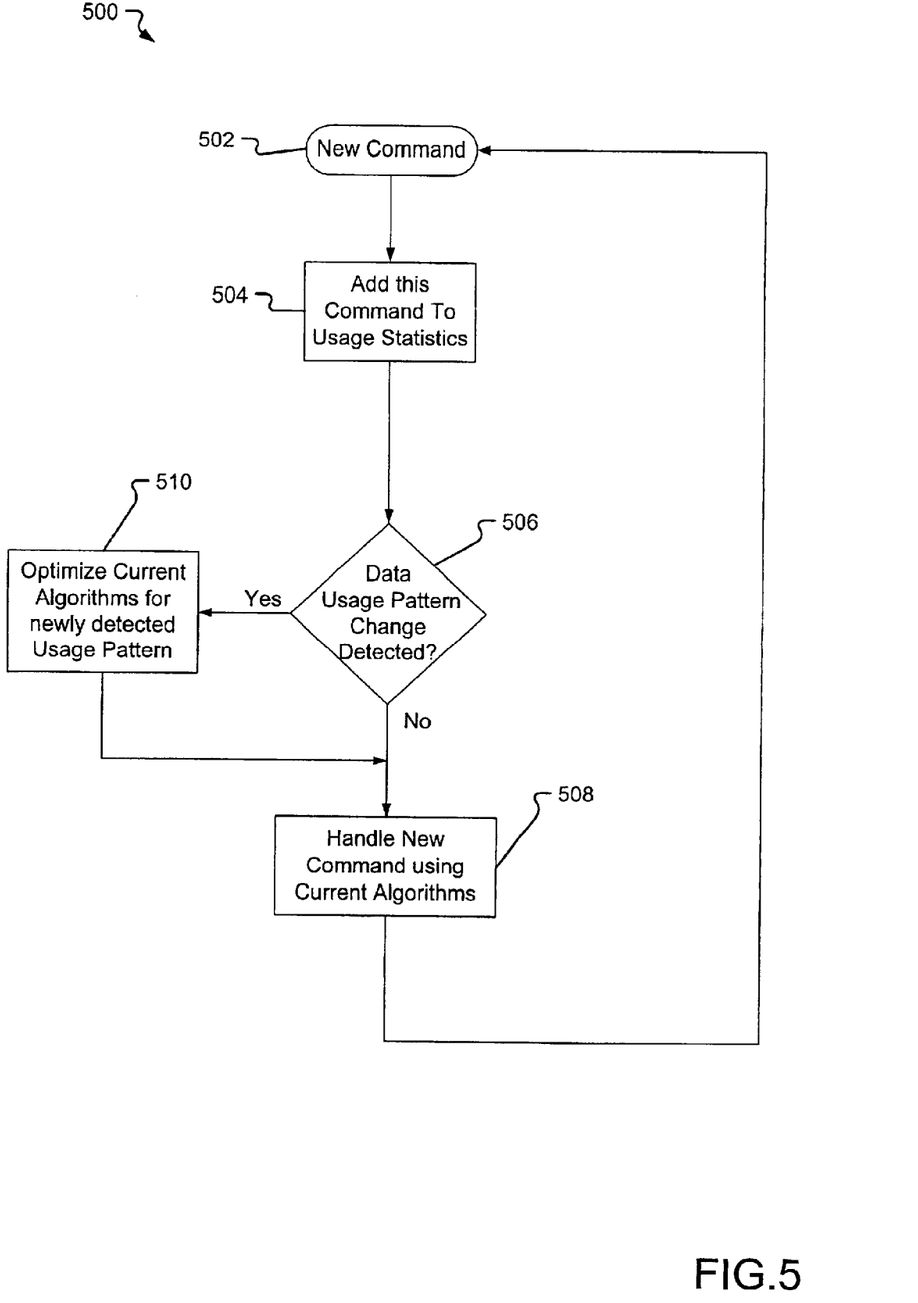
FIG. 5 is a flow chart illustrating a high level operational flow in accordance with an embodiment of the present invention.

FIG. 5 is a flow chart illustrating a high level operational flow 500 that may be implemented in an embodiment of the cache manager 203. A start operation 502 receives a new command. Receipt of the new command at start operation 502 may be interrupt driven, queued, or using any other method known in the art. Control then transfers to an updating operation 504 wherein the command received in the start operation 502 is used to update the usage statistics 304. The usage statistics 304 are preferably stored in a table in memory and may include any statistics related to commands received from the host computer (such as 200 in FIG. 2). For example, the usage statistics 304 may store a percentage of read commands as a percent of all commands received from the host computer 200. As another example, the usage statistics 304 may store locality information describing locations on the discs or in LBA memory that have been accessed. In general, the usage statistics 304 identify a history of disc drive usage. The usage statistics 304 may be used to identify patterns in usage, such that cache management algorithms can be selected to improve disc drive performance.

After the usage statistics 304 are updated in the updating operation 504, control transfers to a determining operation 506 wherein it is determined whether a data usage pattern change is detected. By way of example, and not limitation, a change in usage pattern may be a change from a sequential mode of disc memory access (such as, for example, Microsoft Windows® NTFS) to a random mode of disc memory access. As another example, it may be more efficient to wait for a cache flush command if the host regularly sends the command (such as, for example, as occurs in Microsoft Windows® NTFS), whereas it may be more efficient to frequently flush the cache when the host rarely sends the flush cache command (such as, for example, as occurs in Microsoft Windows® FATS). Other usage patterns and changes in usage patterns are known in the art and may be associated with host computer platforms, operating systems, filing systems, and applications running on the host computer. Determining whether a change in usage pattern is detected may be accomplished by using any means known in the art. Preferably, the determining operation 506 accesses the usage statistics 304 updated in the update operation 504 and compares the usage statistics 304 to analogous statistics corresponding to predetermined usage patterns. Also, the determining operation 506 may employ a correlation algorithm whereby usage statistics are correlated with predetermined data (such as pattern data 315 in FIG. 3) indicating patterns associated with particular host computers, operating systems, file systems, and applications.

If a data usage pattern change is not detected in the determining operation 506, control transfers to a handling operation 508 wherein the new command is handled using the current algorithm. On the other hand, if in the determining operation 506, it is determined that a change in usage pattern is detected, control transfers to an optimizing operation 510 wherein the cache management algorithms are optimized for the newly detected usage pattern. Optimizing the cache management algorithms may include changing a memory reference to refer to a newly selected set of cache management algorithms that have been optimized for the detected usage pattern. Optimizing the cache management algorithms 225 may also include copying selected algorithms into memory of the cache management executive 412. The selected algorithms preferably correspond to the newly detected usage pattern and/or a particular host computer platform. As shown in FIG. 5, control transfers from the handling operation 508 back to the new command operation 502 in a looping fashion.

Figure 6:
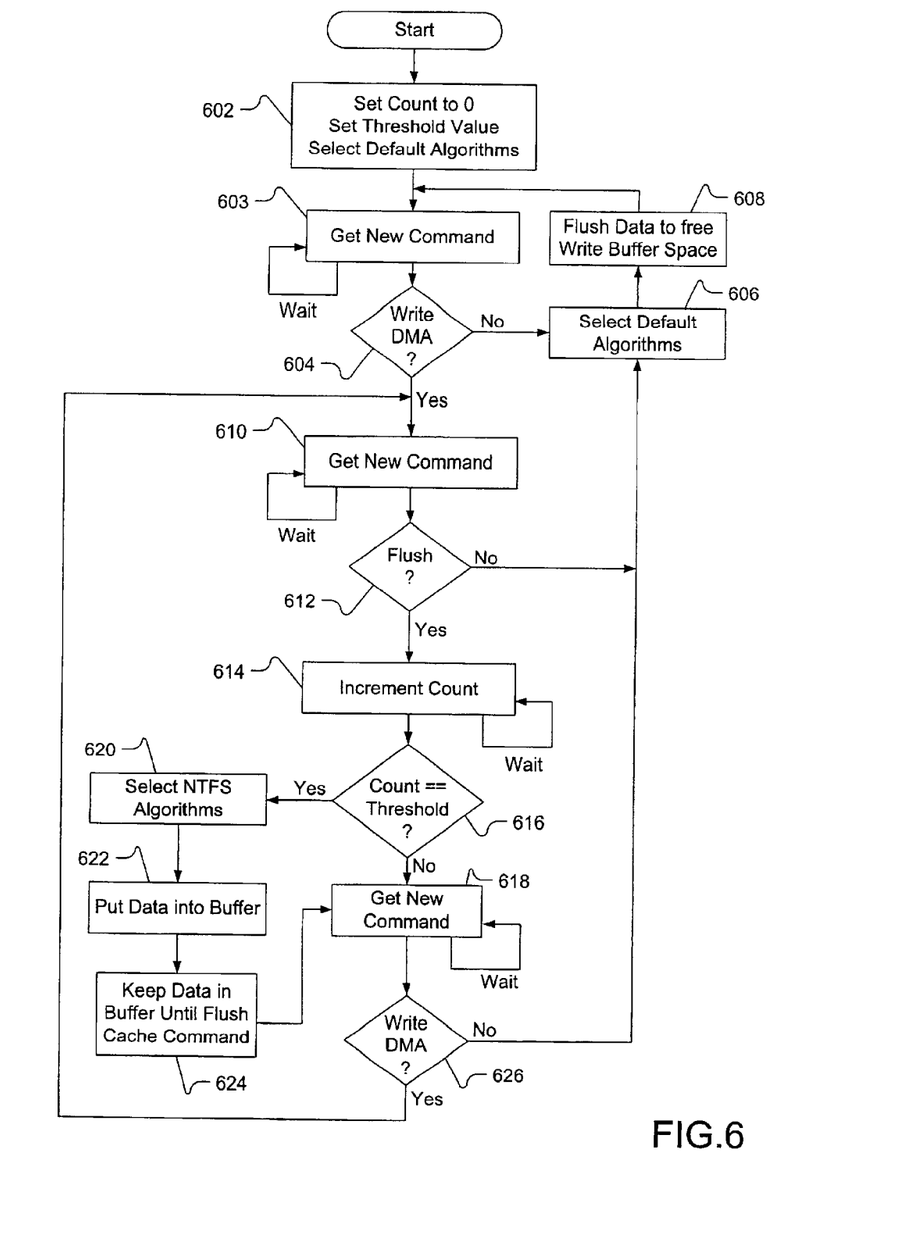
FIG. 6 is a flow chart illustrating an exemplary process of adaptive cache management that may be implemented in the cache manager of FIG. 2.

FIG. 6 is a flow chart illustrating an exemplary process 600 of adaptive cache management that may be implemented in the cache manager 203 of FIG. 3. Specifically, the process illustrates optimizing cache management by selecting between Microsoft Windows® NTFS optimized algorithms and a set of default algorithms. The steps or operations illustrated in FIG. 6 are carried out by the statistics-gathering module 302, usage statistics 304, correlator 306, and switch module 308. An initializing operation 602 sets a count value to 0, sets a threshold value (such as Windows_NTFS_threshold in Table 1), and selects a set of default cache management algorithms (such as the Pattern 1 tool set 340). The cache management executive 310 begins executing algorithms in the Pattern 1 tool set 340. Control then transfers to a new command operation 603, wherein a new command is received from the host 200. The new command operation 603 preferably involves the statistics gathering module 302 receiving the new command and storing the command in the usage statistics 304. The statistics-gathering module 302 also stores a count of the number of commands received.

Control then transfers to a determining operation 604, wherein it is determined whether the command received in operation 603 is an 8 sector Write DMA to the middle of the disc with retry. If the command is not an 8 sector Write DMA to the middle of the disc with retry, control transfers to a selecting operation 606 wherein the default set of cache management algorithms are selected. Control then transfers to a flushing operation 608, wherein data is flushed from the cache to free write buffer space in the cache. Typically during a flush operation, the data in the cache is written to the appropriate address on the disc and erased from the cache so that the memory in cache can be reused. After the flushing operation 608, control returns to the new command operation 603.

If, in the determining operation 604, the new command is an 8 sector Write DMA to the middle of the disc with retry, the 'yes' path is followed to a second new command operation 610. After a new command is received, control transfers to a determining operation 612, which determines whether the new command is a flush cache command. If it is determined in the determining step 612 that the new command is not a flush cache command, control goes back to the selecting operation 606. If in the determining operation 612, the new command is a flush command, control transfers to an incrementing operation 614. The incrementing operation increments the count by 1, to indicate that 1 more pair of Write DMA/Flush Cache commands has been received. In other words, the count variable, which was initialized to zero in the initialization operation 602 counts the pair of Write DMA and Flush cache commands received in the new command operations 603 and 610. Control transfers to a determining operation 616 wherein it is determined whether the count is equal to the threshold (such as Windows_NTFS_threshold in Table 1) of the initialization operation 602.

In the determining operation 616, the correlator 306 may read the Windows_NTFS_threshold value from the Microsoft Windows® NTFS Pattern data 316 and compare the count to the Windows_NTFS_threshold. The threshold value can be any value suitable to the implementation and useful to detect a Microsoft Windows® NTFS disc access pattern. The threshold value is preferably selected to provide a desired sensitivity to changes in the disc access pattern. Generally, the greater the threshold value, the less sensitive the cache manager 203 will be to a change in disc access. One implementation may use a higher value for the threshold so that a recognition of Microsoft Windows® NTFS is more likely a correct detection.

If it is determined that the count is not equal to the threshold value, control transfers to a new command operation 618. The new command operation 618 waits for the next command to be received. As earlier, the statistics-gathering module 302 stores the next command along with a count in the usage statistics 304. If the count is equal to the threshold value in the determining operation 616, control transfers to a selecting operation 620. The selecting operation 620 selects Microsoft Windows® NTFS cache management algorithms, such as those in the NTFS tool set 332. The Microsoft Windows® NTFS cache management algorithms include read, write and flush algorithms that are optimized for operation with a host computer platform using Microsoft Windows® NTFS. Selecting the Microsoft Windows® NTFS cache management algorithms may include setting a base pointer to algorithms stored in MEM 224 associated with the Microsoft Windows® NTFS. As has been discussed, by selecting cache management algorithms optimized for the host computer platform, the cache hit ratio can be increased.

After the Microsoft Windows® NTFS cache management algorithms have been selected in the selecting operation 620, control transfers to a copying operation 622. In the copying operation 622, the data requested by the new command (in the new command operation 610) is copied to the cache management buffer 210. Control then transfers to a waiting operation 624 wherein the data written to the buffer 210 is kept in the buffer 210 until a flush cache command is received from the host computer 200. In the Microsoft Windows® NTFS operating system, it is more efficient to wait for the flush cache command before committing data to the disc. After the waiting operation 624, control transfers to the new command operation 618, wherein a new command is received as discussed above.

After a new command is received in the new command operation 618, control transfers to a determining operation 626, which determines if the new command is another 8 sector Write DMA to the middle of the disc with retry. If so, control transfers back to the new command operation 610, wherein the process begins again to detect another pair of Write DMA/Flush cache commands. If, however, the new command is not an 8 sector Write DMA to the middle of the disc with retry, control transfers to the selecting operation 606 wherein the set of default cache management algorithms is selected. The set of default cache management algorithms that are selected may be any algorithms that provide a general level of optimization.

In summary, an embodiment may be viewed as a method of optimizing cache management in a data storage device (such as 100) that receives disc access command from a host computer (such as 200). The method generally involves receiving a new command (such as 502, 603, 610, and 618) from the host computer (such as 200), selecting (such as 620 and 606) a cache management algorithm (such as 330) based on the data access pattern, employing (such as 508) the cache management algorithm (such as 330) to process the new command. Selecting a cache management algorithm preferably involves updating (such as 504) a set of usage statistics (such as 304) in response to receipt of the new command, determining (such as 506) whether a change is detected in the data usage pattern, and if a change is detected in the data usage pattern, selecting a cache management algorithm (such as 330) associated with the data usage pattern. Determining a change in the data usage pattern involves correlating (such as 602, 603, 604, 610, 612, 614, 616, 618, 620, 622, 624, and 626) the set of usage statistics (such as 304) with a predetermined usage pattern (such as 315) associated with known host computer platforms.

Another embodiment may be viewed as a cache manager (such as 203) managing caching in a data storage device (such as 100). The cache manager (such as 203) preferably includes a usage statistics module (such as 304) that stores statistics associated with a sequence of commands and a configuration module (such as 211) that includes pattern data (such as 315) indicative of recognized patterns of command sequences. A correlator (such as 306) correlates the usage statistics (such as 304) with the pattern data (such as 315) to determine a match between the usage statistics (such as 304) and one of the sets of pattern data (such as 315). The cache manager (such as 203) may further include a statistics-gathering module (such as 302) for gathering (such as 504) statistics related to the sequence of commands. Still further, the cache manager (such as 203) may include a switch module (such as 308) that receives correlation data (such as 307) from the correlator (such as 306) and selects one cache management algorithm (such as 330) among a set of cache management algorithms (such as 225) based on the pattern data (such as 315) matched with the usage statistics (such as 304). The cache manager (such as 203) preferably includes a cache management executive (such as 310) to execute the selected cache management algorithm (such as 330).

In yet another embodiment, a data storage device (such as 100) includes a cache buffer (such as 210) for buffering commands and data, and a means (such as 203) for adaptively selecting (such as 508, 620, and 606) a cache management algorithm (such as 330). The algorithm selection means (such as 203) includes a usage statistics module (such as 304) storing usage statistics associated with a sequence of commands to the data storage device (such as 100) and a correlator (such as 306) for correlating (such as 506, 604, and 616) the usage statistics (such as 304) with predetermined usage pattern data (such as 315) corresponding to predetermined usage patterns (such as 316) and generating (such as 506, 604, and 616) correlation data (such as 307). The algorithm selection means (such as 203) may include a tool set (such as 330) that stores two cache management algorithms (such as 332 and 334), and a switch module (such as 308) that receives the correlation data (such as 307) and determines (such 506, 604, and 616) as a best match between the usage statistics (such as 304) and one of the predetermined usage pattern data (such as 315).

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

It will be clear that the present invention is well adapted to attain the ends and advantages mentioned as well as those inherent therein. While a presently preferred embodiment has been described for purposes of this disclosure, various changes and modifications may be made which are well within the scope of the present invention. The present invention may be implemented in any storage device that employs cache management. For example, the present invention may be implemented in a magnetic tape storage device. Additionally, any of the components illustrated in the figures may be implemented together in any combination. For example, the switch module may be implemented as part of the correlator. Numerous other changes may be made which will readily suggest themselves to those skilled in the art and which are encompassed in the spirit of the invention disclosed and as defined in the appended claims.

What is claimed is:

1. A method of optimizing cache management in a data storage device in operable communication with a host computer, the method comprising steps of:
   (a) receiving a command from the host computer exhibiting a data usage pattern;
   (b) selecting a cache management algorithm based on the data usage pattern by:
      (b)(i) updating a set of usage statistics in response to receipt of the command; and
      (b)(i)(1) correlating the set of data usage statistics with a predetermined set of usage patterns associated with known host computer platforms to identify one of the host computer platforms that most closely matches the set of usage statistics; and
      (b)(ii) determining whether a chance is detected in the data usage pattern; and
      (b)(iii) if a change is detected in the data usage pattern, selecting a cache management algorithm associated with the data usage pattern, wherein the data storage device is a disc drive having a data disc and the selecting step (b)(iii) comprises steps of:
         (b)(iii)(1) directing a cache management executive to execute the selected cache management algorithm, wherein the directing step (b)(iii)(1) comprises steps of:
            (b)(iii)(1)(i) changing a switch position to point to the selected cache management algorithm: and
   (c) employing the cache management algorithm to process the command.

2. The method of claim 1 wherein the directing step (b)(iii)(1) further comprises steps of:
   (b)(iii)(1)(i) transmitting a base memory offset associated with the selected cache management algorithm to the cache management executive.

3. The method of claim 1 wherein the data storage device is a disc drive having a disc storing sets of cache management algorithms, the method further comprising steps of:
   (d) copying the sets of cache management algorithms from the data disc to memory.

4. The method of claim 1 wherein the data storage device is a disc drive having a data disc and the method further comprises steps of:
   (d) copying the predetermined set of usage patterns from the data disc to memory.

5. A cache manager for managing caching in a data storage device comprising:
   a usage statistics module storing statistics associated with a sequence of commands received by the data storage device;
   a configuration module storing one or more sets of pattern data indicative of predetermined patterns of command sequences associated with known file systems;
   a correlator accessing the usage statistics module and the pattern data in the configuration module and correlating the usage statistics with the pattern data to determine a match between the usage statistics and one of the sets of pattern data,
   a statistics-gathering module operably connected to the usage statistics module for gathering statistics related to the received sequence of commands and transmitting the statistics to the usage statistics module,
   a switch module receiving correlation data from the correlator and selecting one cache management algorithm from among a set of cache management algorithms based on the one or more sets of pattern data matched with the usage statistics, and
   a cache management executive operable to execute the selected cache management algorithm.

6. The cache manager of claim 5 further comprising:
   a notification signal transmitted by the switch module notifying the cache management executive of the selected cache management algorithm.

7. The cache manager of claim 6 wherein the notification signal comprises:
   a base memory pointer referencing a memory location storing the selected cache management algorithm.

8. A cache manager for managing caching in a data storage device comprising:
   a usage statistics module storing statistics associated with a sequence of commands received by the data storage device;

a configuration module storing one or more sets of pattern data indicative of predetermined patterns of command sequences associated with known file systems; and a correlator accessing the usage statistics module and the pattern data in the configuration module and correlating the usage statistics with the pattern data to determine a match between the usage statistics and one of the sets of pattern data, wherein each of the one or more sets of pattern data comprises a threshold value, wherein the correlator compares usage statistics for consecutive read commands corresponding to a read mode against the threshold value to determine a match between the usage statistics and one of the sets of pattern data.

9. A data storage device comprising:

a cache for buffering commands and data; and a means for adaptively selecting a cache management algorithm based on matching statistics associated with a sequence of commands received by the data storage device with one of a plurality of sets of predetermined usage pattern data, each set of usage pattern data being associated with one of a plurality of known file systems, wherein the means for adaptively selecting a cache management algorithm comprises:

a usage statistics module storing usage statistics associated with a sequence of commands received by the data storage device:

a correlator in operable communication with the usage statistics module correlating the usage statistics with each of one or more sets of predetermined usage pattern data corresponding to known usage patterns and generating correlation data:

two cache management algorithms, wherein each cache management algorithm is associated with one of the known usage patterns, a switch module receiving the correlation data and determining a best match between the usage statistics and one of the one or more sets of predetermined usage pattern data and selecting one of the cache management algorithms based on the best match, and a cache management executive operably connected to the switch module, the cache management executive executing the selected one of the cache management algorithms.

10. The data storage device of claim 9 wherein each of the one or more sets of predetermined usage pattern data includes a threshold value, wherein the correlator compares usage statistics for consecutive read commands associated with a read mode against the threshold values to determine a match between the usage statistics and one of the sets of pattern data.

11. The data storage device of claim 9 wherein each of the one or more sets of predetermined usage pattern data includes a threshold value, wherein the correlator compares usage statistics for consecutive Write Direct Memory Access (DMA) and flush cache command pairs against the threshold values to determine a match between the usage statistics and one of the sets of pattern data.

12. The data storage device of claim 9, wherein at least one of the plurality of known files systems is a member of the group consisting of: Microsoft Windows® NTFS, Microsoft Windows® FATS, Unix, and Apple®.

* * * * *